United States Patent [19]

Stannek

[11] Patent Number: 4,858,974
[45] Date of Patent: Aug. 22, 1989

[54] ROBOTIC GRIPPER HEAD

[76] Inventor: Karl H. Stannek, 20122 Kline Dr., Santa Ana Heights, Calif. 92707

[21] Appl. No.: 189,031

[22] Filed: May 2, 1988

[51] Int. Cl.⁴ .................. B25J 15/06; B66G 47/91; H05K 13/02
[52] U.S. Cl. .................................. 294/2; 29/740; 29/743; 294/64.1; 294/902
[58] Field of Search ............ 294/2, 64.1, 82.32, 294/86.4, 88, 106, 115, 116, 118, 99.2, 90.2; 29/740, 743, 759; 414/606, 737, 752; 901/31, 39, 40

[56] References Cited

U.S. PATENT DOCUMENTS

| | | | |
|---|---|---|---|
| 4,348,044 | 9/1982 | Wood | 294/115 X |
| 4,473,247 | 9/1984 | Itemadani et al. | 294/2 |
| 4,716,986 | 8/1988 | Maunz et al. | 294/116 X |
| 4,717,190 | 1/1988 | Witherspoon | 294/902 X |

FOREIGN PATENT DOCUMENTS

| | | | |
|---|---|---|---|
| 99080 | 8/1924 | Austria | 294/2 |
| 1282499 | 12/1961 | France | 294/82.32 |

Primary Examiner—Johnny D. Cherry
Attorney, Agent, or Firm—Fulwider, Patton, Rieber, Lee & Utecht

[57] ABSTRACT

A robotic gripper head includes mechanically actuated gripping fingers having gripping surfaces which are arcuately shaped to perpendicularly contact opposed grip ends of a flat part.

1 Claim, 4 Drawing Sheets

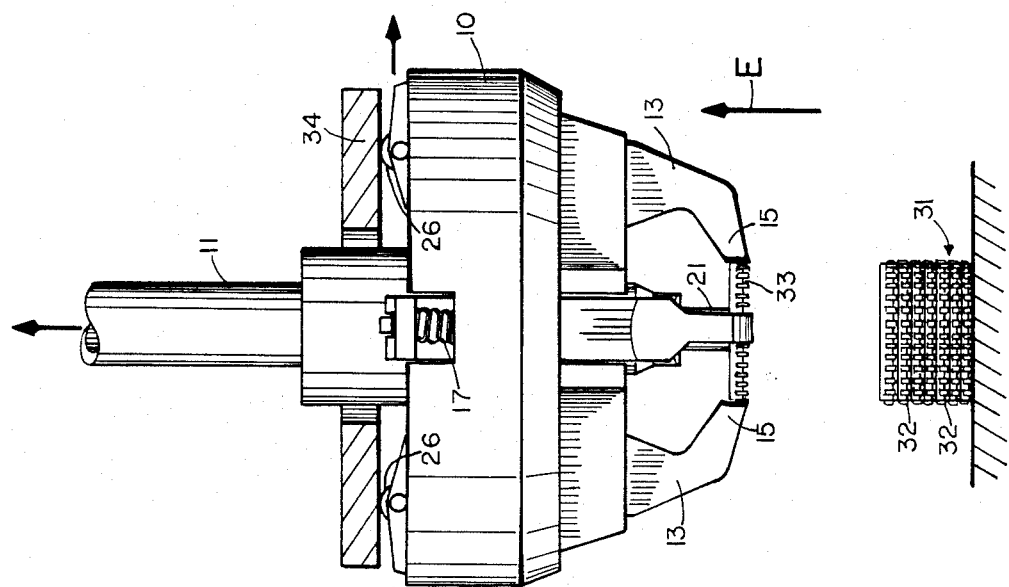
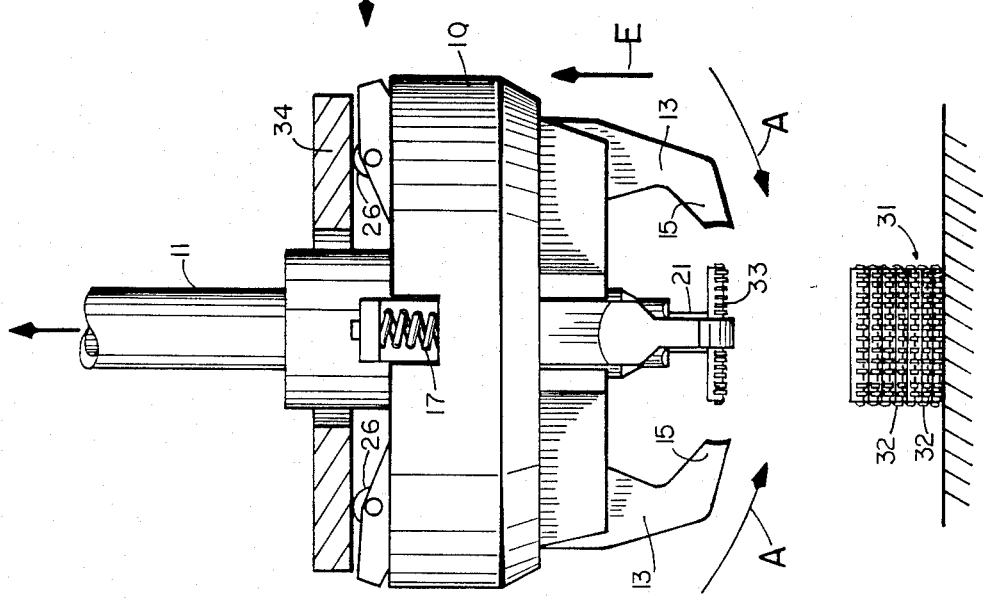
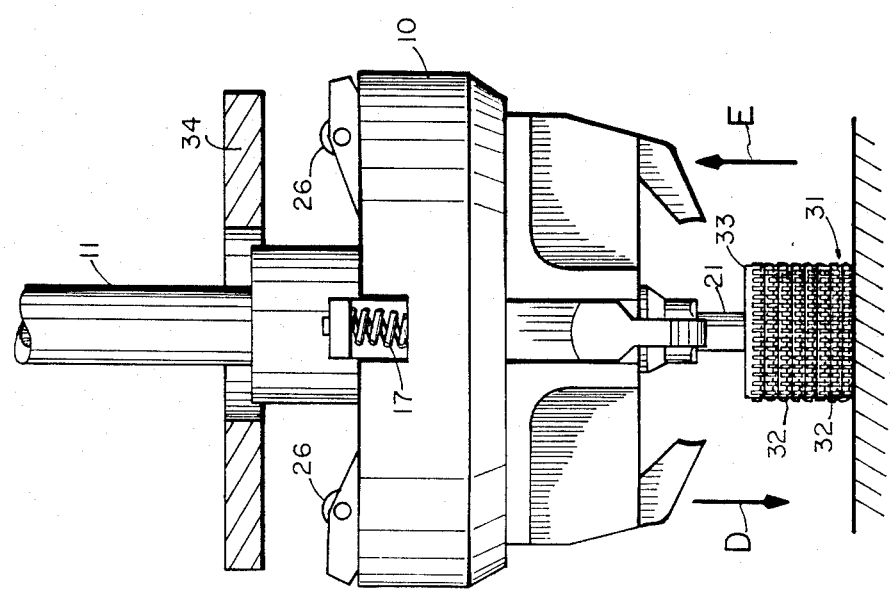

ROBOTIC GRIPPER HEAD

This invention relates to robotics.

More particularly the invention concerns an improved gripper head for picking parts from a supply station and transferring them to a work station.

Even more specifically, the invention pertains to an improved gripper head which is specially adapted to handle flat parts of variable widths and lengths.

In robotic manufacturing systems, it is common practice to move an assembly of some elements along a conveyor to successively spaced work stations, at which additional parts are added to the assembly. For example, such "assembly line" technique is commonly used in manufacturing multi-component circuit boards for electronic devices. In manufacturing such circuit boards it is commonly necessary for robotic apparatus to handle parts with widely varying dimensions and geometry.

According to the prior art, if a single robotic arm is required to handle parts of different size at a single work station, it is common practice to supply a series of "gripper heads" for the robotic arm. Each of the gripper heads is specially dimensioned and adapted to handle only a single one of such parts. As the manufacturing operation proceeds, the robotic arm selects and attaches to itself the proper gripping head for one part, moves that part from the supply station to the work station, returns the original gripper head to a head storage location, selects and attaches another gripper head adapted to handle a part of different dimensions, moves that part, and so on, successively until all parts have been moved from their supply location to the work station.

These intermediate operations of changing gripper heads between the part movements waste a lot of time and introduce undesirable mechanical complexities in the operation. Therefore, it would be highly desirable to provide a single gripper head which can handle parts of variable dimensions so that several such parts can be moved from their respective supply locations to the work stations without requiring successive changes of gripper heads.

Therefore, the principal object of the present invention is to provide an improved robotic gripper head. Another objective of the invention is to provide a robotic gripper head which is capable of handling parts of variable dimensions.

These, other and more specific objects and advantages of the invention will be apparent to those skilled in the art from the following detailed description thereof, taken in conjunction with the drawings in which:

FIG. 3 depicts the gripper head of FIG. 1 positioned to selectively abstract a part from a stack of such parts;

FIG. 4 depicts the gripper head of FIG. 3 after the part has been abstracted from the stack and the gripping fingers are moved partially into gripping position;

FIG. 5 depicts the gripper head and part of FIGS. 3-4 after the head has moved further away from the stack and the fingers have moved fully inwardly to grip the part for movement to a work station;

Figure 1:
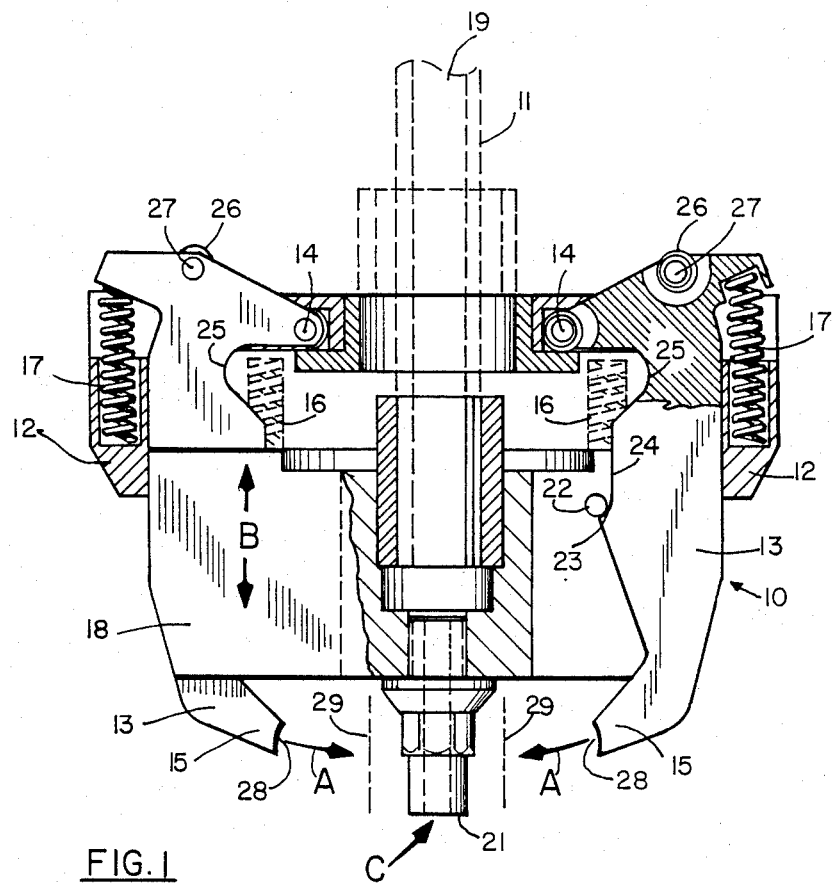
FIG. 1 is a partially cut-away assembly view of a gripper head constructed in accordance with the principles of the present invention.

Briefly, in accordance with my invention I provide improvements in a prior art robotic gripper head. Such prior art gripper head selectively picks a flat part from a station of plurality of such parts at a supply station, transfers the selected part from the supply station to a work station and positions the transferred part in a preselected location at the work station.

The prior art gripper head is carried by a robotic arm to move the head between the supply and work stations and includes vacuum means for selectively abstracting the selected part from the supply station to a part-gripping location spaced from the stack. A plurality of mechanically-actuated gripping fingers are pivotally attached to the head. The opposed free ends of the fingers are spaced away from the part during the part-abstracting operation and are pivoted arcuately inwardly at the part-gripping location, to grip the abstracted part on opposed edges thereof. These fingers retain the part during movement of the part from the spaced part-gripping location to the work station.

The improvement of the invention provides for handling parts of variable transverse dimensions without changing gripper heads on the end of the robotic arm. The improvement comprises at least a pair of gripping fingers, having gripping surfaces formed on the inner sides of the free ends thereof, said gripping surfaces being arcuately curved in the pivoting plane of said fingers, to exert a force on a part gripped there between which tends to hold or move said part into vacuum sealing contact with said suction tube.

In the drawings, in which a gripper head constructed in accordance with the improvements of the present invention, which is chosen for purposes of illustrating the presently preferred embodiments of the invention and not by way of limitation, like reference characters depict the same elements in the several views.

Figure 2:
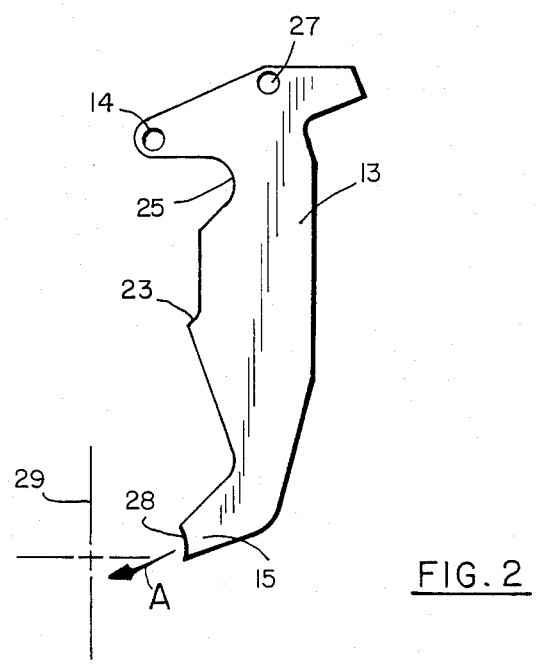
FIG. 2 depicts one f the gripping fingers of the gripper head of FIG. 1.

FIG. 1-2 depicts a gripper head, generally referenced by numeral 10, carried on the shaft end 11 of a robotic's arm (not shown). The gripper head comprises a body portion 12, which carries at least a pair of gripping fingers 13 on pivot pins 14 journaled in the body 12 to permit movement of the lower free ends 15 of the gripping fingers 13 arcuately inwardly as indicated by the arrows A. Outer coil springs 17 normally urge the gripping fingers 13 into the fully retracted position (shown in FIG. 1). A hub member 18 is disposed for vertically reciprocating motion as indicated by the arrows B within the body portion 12. Inner coil springs 16 urge the hub member 18 into the downward position shown in FIG. 1. The shaft end 11 is hollow (as shown) and the central bore 19 thereof communicates with a vacuum pump which draws air inwardly, as indicated by the arrow C through a part-contacting tip 21 carried in and extending through the hub 18 in fluid communication with the bore 19 of the shaft end 11. Transverse limit pins 22 carried in the hub 18 prevent downward movement of the hub 18 by contact with the shoulder 23 found in the gripping fingers 13 and, further prevent inward movement of the gripper fingers 13 as the hub 18 moves upwardly relative to the body 12 until the limit pins 22 clear the flats 24 on the gripping fingers, at which point the gripping fingers are allowed to move inwardly as the limit pin 22 rides into the recess 25 of the gripping fingers 13. Roller bearings 26 are journaled on transverse pins 27 carried in the upper end of the gripping fingers 13. The inner opposed gripping surfaces 28 of the free ends 15 of the gripping fingers 13 are arcuately shaped as shown. The radius of curvature of gripping surfaces 28 will vary depending on the exact mounting and pivoting geometry of the finger, but is selected to always provide a curved, upwardly and outwardly flared surface to contact opposed gripped edges of a flat part positioned between the surfaces 28.

The function of these curved surfaces will be explained by reference to FIGS. 6–8.

Turning to FIGS. 3–5, the general mode of operation of the gripper head of FIG. 1 will now be explained.

As shown in FIG. 3, the gripper head 10, mounted on the robotic arm 11 is positioned above a stack 31 forming a supply of individual electronic parts 32. As previously mentioned, the arm 11 is provided with a central bore (not shown in FIGS. 3–5) which provides a conduit communication with a suction tip 21. As the gripper head 10 is moved downwardly in the direction of the arrow D, the tip 21 touches the topmost part 33 in the stack 31 and when the gripper head 10 is then moved upwardly in the direction of arrow E, selectively moves the part 33 away from the stack 31 of remaining parts 32.

As shown in FIG. 4, further upward movement of the gripper head 10 in the direction of the arrow E brings the roller bearings 26 into contact with a fixed plate 34, causing the fingers 13 to pivot around pin 14 (FIG. 1-2) and the lower free ends 15 of fingers 13 move inwardly in the direction of the arrows A, against the action of the springs 17.

As shown in FIG. 5, further upward movement of the gripper head 10 in the direction of the arrow E causes further depression of the rollers 26, bringing the inner free ends 15 of the gripping fingers 13 into contact with opposed edges of the abstracted part 33. At this point, the part is positioned both laterally and vertically by the gripping fingers 13 and is held against the lower end of the vacuum tube 21. With the part thus securely held, the entire assembly of the gripper head and robotic arm 11 can now be moved to a work location to deposit the part 33 precisely in a pre-selected location for further processing. At the work location, the process illustrated in FIGS. 3–5 is simply reversed to release the part 33 at the work station.

Figure 6:
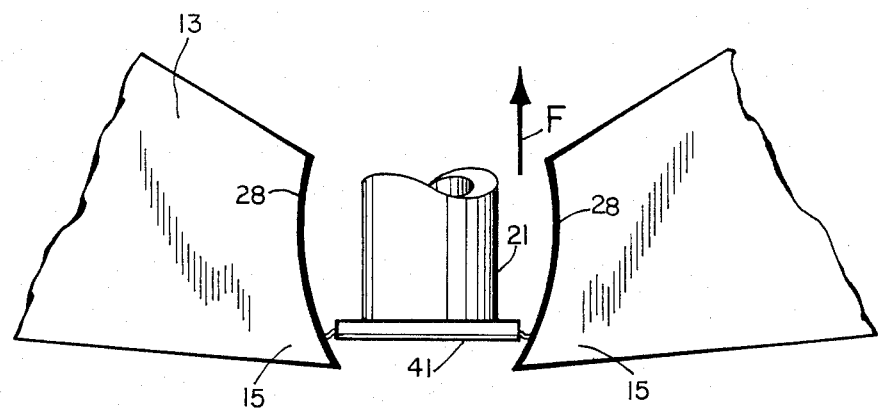
FIG. 6 depicts the positioning of a relatively small part between the gripper fingers.
Figure 7:
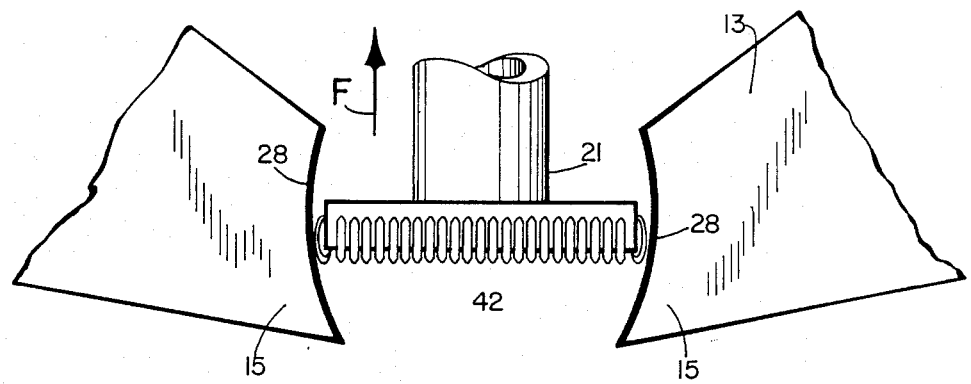
FIG. 7 depicts the gripping of a somewhat larger part between the gripping fingers.
Figure 8:
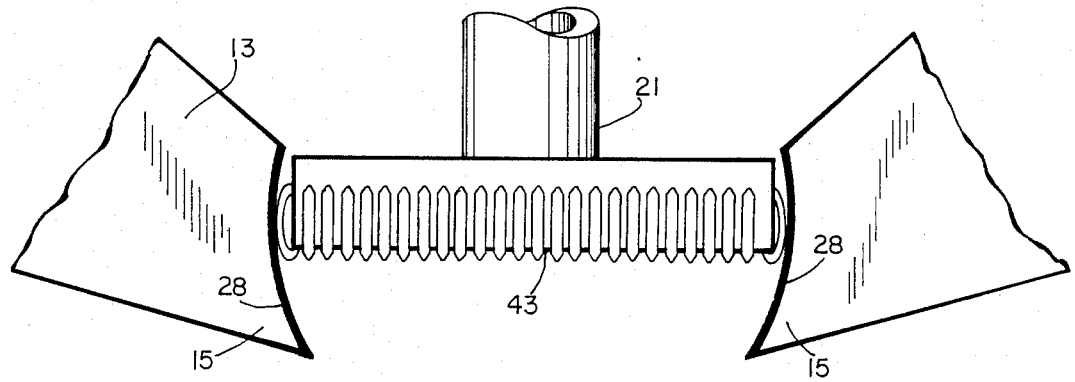
FIG. 8 depicts the gripping of an even larger part.

FIGS. 6–8 further illustrate the mode of operation of the gripper head of FIG. 1 and depict how the head is able to securely grip parts having different dimensions. For purposes of illustration, FIGS. 6–7 depict handling of flat electronic circuit parts having electrical contact carried on opposed edges. For example, the part 41 depicted in FIG. 6 is a relatively small part having so-called "pin leads", whereas the parts 42 and 43 are respectively larger in the transverse directions and in thickness and are of the type provided with so-called "J leads".

Figure 9:
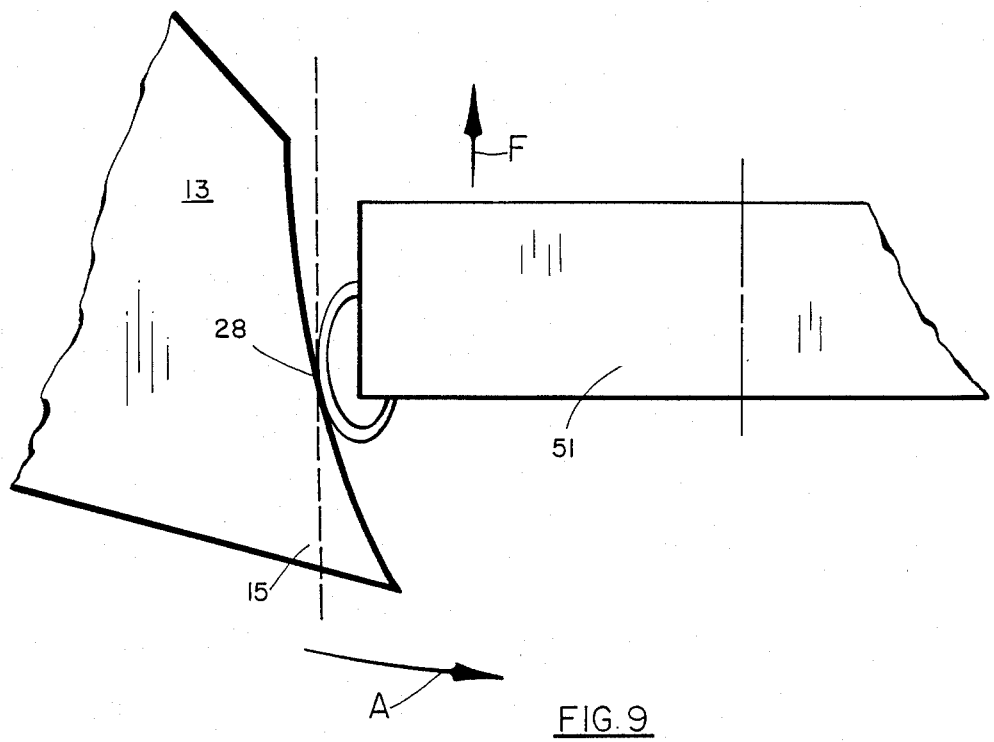
FIG. 9 shows in greater detail the gripping contact between a gripping finger and the edge of an electronic part having "J"leads.
Figure 10:
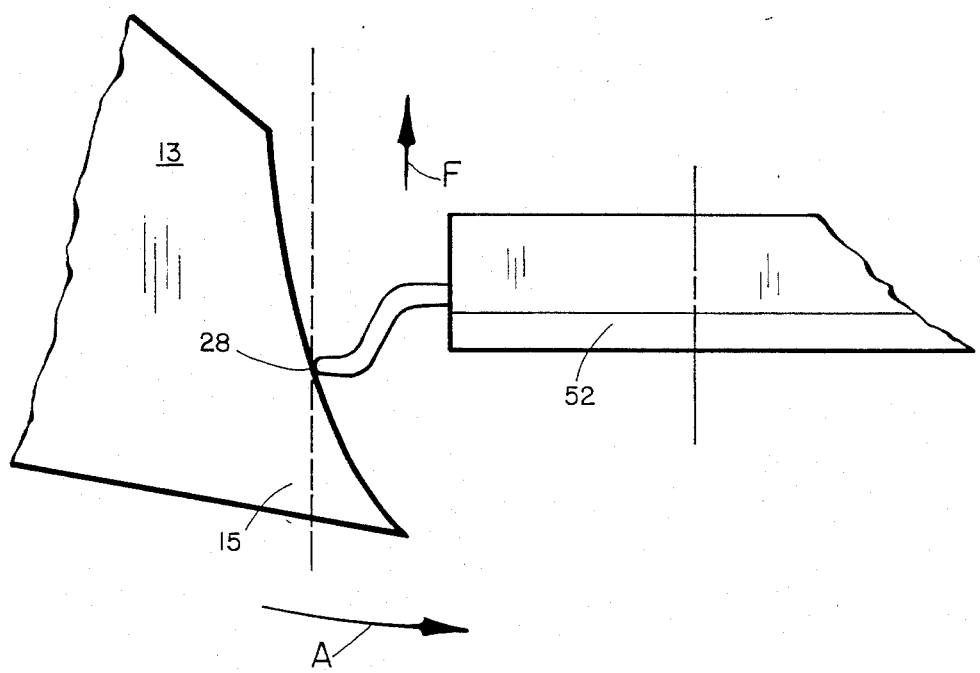
FIG. 10 shows in greater detail the gripping contact between a gripping finger and the edge of an electronic part having "pin" leads.

By inspection of FIGS. 6–8, it will be apparent that irrespective of the transverse dimensions of the parts 41, 42, and 43, and irrespective of their thicknesses, the parts are securely positioned by contact with the curved surfaces 28 of the inner ends 15 of the gripping fingers 13 (shown broken away for clarity) It should be noted that each of the parts 41, 42, and 43, are contacted by the curved surfaces 28 in such a way as to either hold the part against the lower end of the suction tube 21 in equilibrium (as shown in FIG. 8) or in such fashion as to exert a slight upward force in the direction of the arrows F to cause positive contact and vacuum sealing engagement with the tip 21. These modes of contact are further illustrated in larger scale in FIGS. 9–10. FIG. 9 shows one of the lower ends 15 of gripping fingers 13 in gripping contact with an electronic part 51 having J leads and FIG. 10 shows a part 52 having pin leads.

Having described my invention in such terms as to enable those skilled in the art to which it pertains to understand and practice it, and having described the presently preferred embodiments thereof, I claim:

1. In a robotic gripper head for
   selectively abstracting a flat part from a stack of a plurality of such parts at a supply station,
   transferring the abstracted part from the supply station to a work station, and
   positioning the transferred part in a preselected location at said work station,
   said gripper head, carried by a robotic arm to move said head between said supply and work stations, including
   vacuum means including a part-contacting suction tube for selectively abstracting the selected part from the stack thereof to a part-gripping location spaced from said stack, and
   a plurality of mechanically-actuated gripping fingers, pivotally attached at their upper ends to said head, and having free lower ends which are spaced away from said part during the part-abstracting operation and which are pivoted arcuately inwardly at said spaced location, to grip said abstracted part on opposed edges thereof,
   to retain said part during movement thereof from said spaced location to said work location,
   the improvement for handling parts have variable transverse dimensions, comprising:
   (a) at least a pair of said gripping fingers, pivotally attached at their upper ends to said gripper head for pivotal movement in vertical planes, and
   (b) means defining opposed arcuate gripping surfaces formed in opposed lower ends of said fingers, said surfaces being concave in said vertical planes.

* * * * *